Sept. 24, 1963     J. J. MONAHAN     3,104,760
APPARATUS FOR TESTING AND SORTING POLARIZED ARTICLES
Filed Feb. 8, 1962     2 Sheets-Sheet 1

INVENTOR
J. J. MONAHAN
By
ATTORNEY

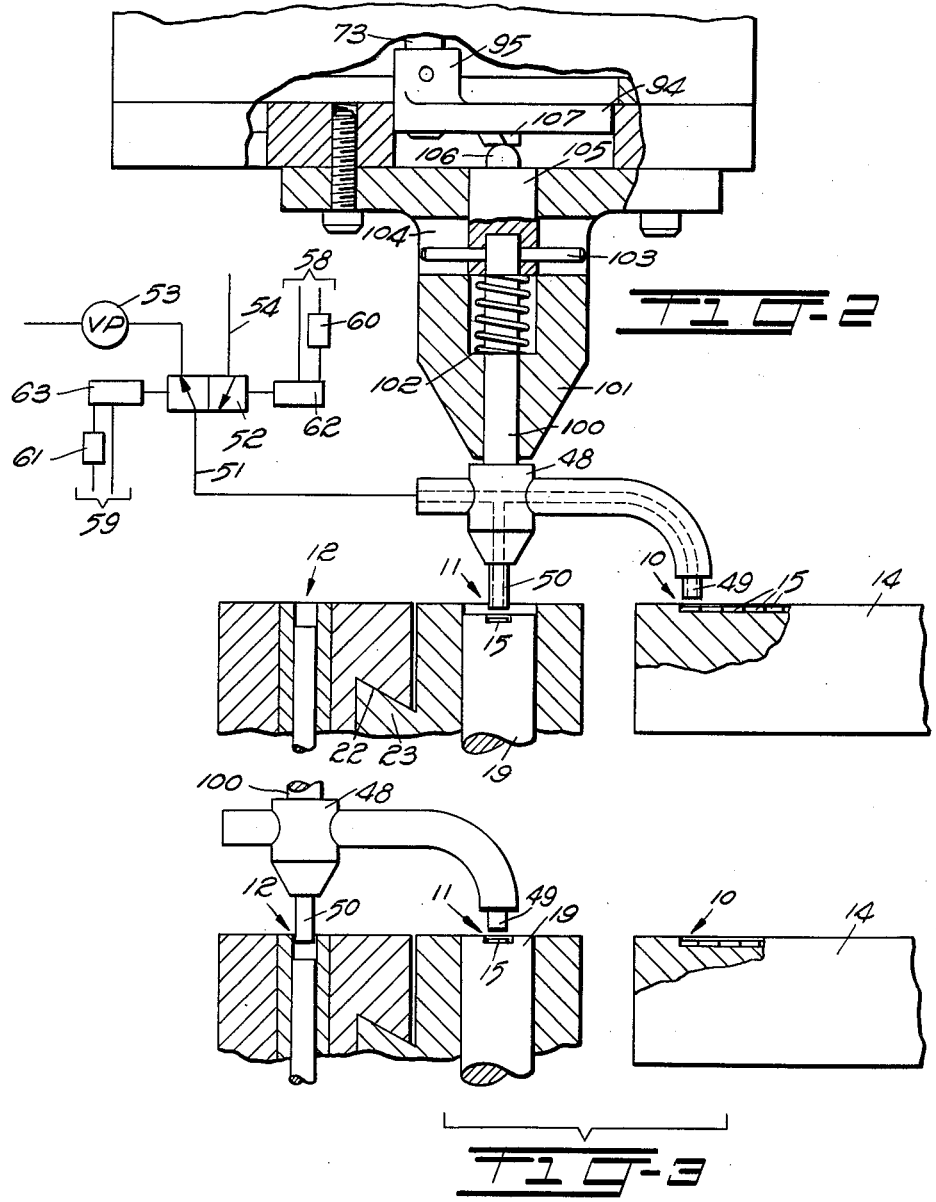

ered Sept. 24, 1963

3,104,760
APPARATUS FOR TESTING AND SORTING
POLARIZED ARTICLES
Jack J. Monahan, Allentown, Pa., assignor to Western Electric Company, Incorporated, New York, N.Y., a corporation of New York
Filed Feb. 8, 1962, Ser. No. 172,003
4 Claims. (Cl. 209—74)

This invention relates to apparatus for testing and sorting polarized articles, particularly diffused silicon wafers.

The diffused silicon wafers which are to become parts of electrical components cannot be oriented by the conventional feeders so that they may be placed in predetermined orientation in their respective electrical components. Furthermore, occasionally defective wafers appear and to accomplish the two purposes of eliminating the defective wafers and stacking the other wafers in predetermined positions, it is necessary that all of the wafers be subjected to a given series of tests.

An object of the present invention is an apparatus which is simple in structure yet highly efficient in testing and sorting polarized articles.

In accordance with the object, the apparatus comprises a test unit disposed at a test station interposed between a feed station and a receiving station, the latter having a carriage with spaced respecticles adapted to receive in one, articles with their negative ends uppermost, and to receive in another, articles with their positive ends uppermost, and means responsive to tests made on successive articles moved from the feed station onto the test station to locate the carriage with the proper receptacle located at the receiving station for the article being tested.

Other objects and advantages will be apparent from the following detailed description when considered in conjunction with the accompanying drawings wherein:

FIG. 2 is an enlarged fragmentary detailed view of a portion of the apaprtus with the transfer head in one position; and, FIG. 3 is a fragmentary detailed view of a portion of the apparatus with the transfer head in another position.

Figure 1:
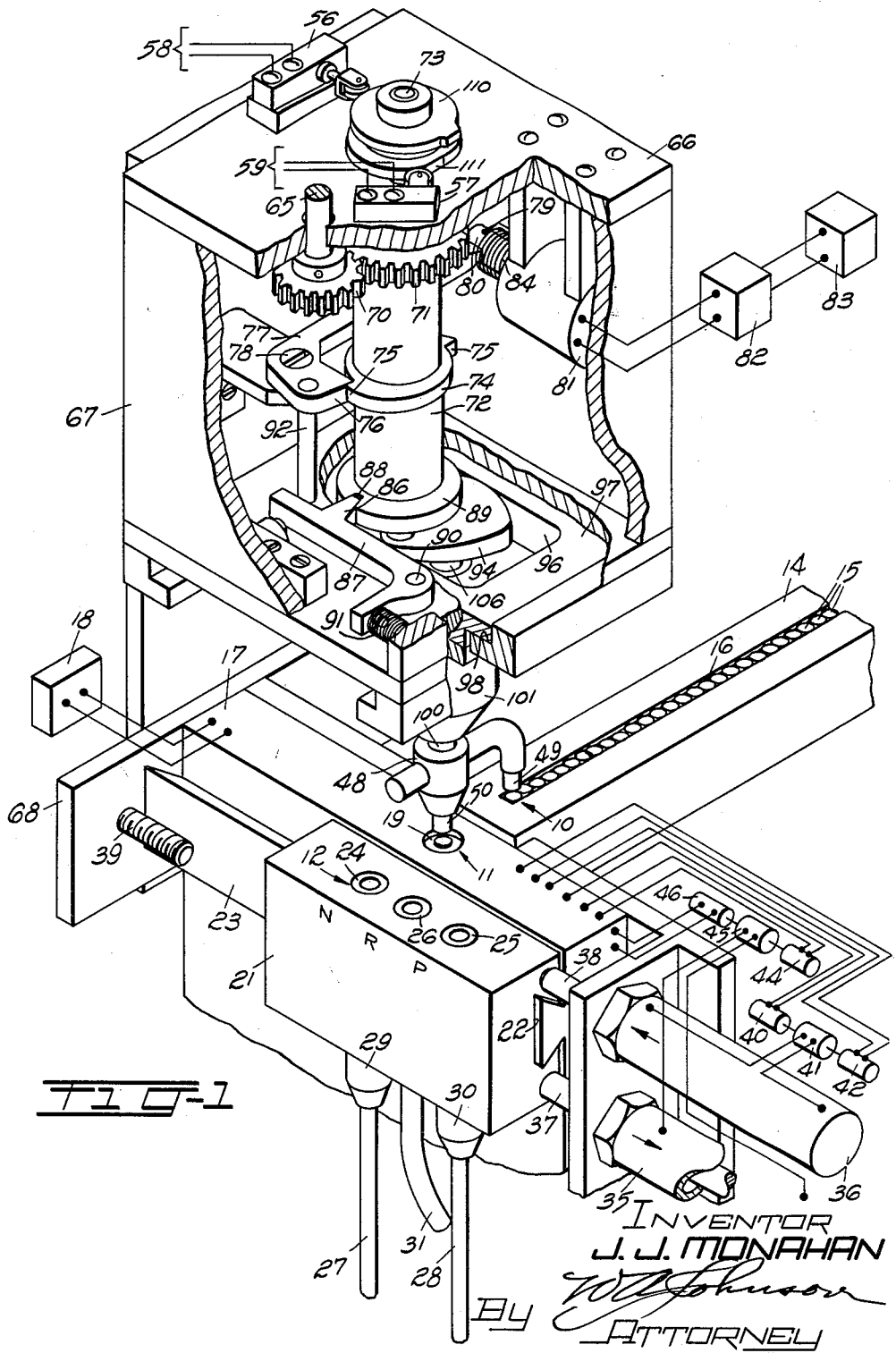
FIG. 1 is an isometric view of the apparatus, portions thereof being broken away.

In the apparatus, shown particularly in FIG. 1, there is a feed station 10, a test station 11, and a receiving station 12. A chute 14 extending from a vibrating feeder, not shown, continuously delivers polarized articles 15 in a guided path 16 to the feed station 10.

The test station 11 includes a test unit 17 receiving electrical energy from a source 18 and provided with a nest 19 (FIGS. 1, 2, and 3) to receive the successive articles or wafers 15 and to include them singly in any desired commercially known test circuits capable of determining their efficiency and adaptability for use and also to determine the positions of their respective poles.

The receiving station 12 is in alignment with the feed station 10 and the test station 11. A carriage 21 has a dovetail slot 22 to ride on a dovetail guide 23 which is mounted on one side of the test unit 17. The carriage 21 has a negative receptacle 24, a positive receptacle 25, and a reject receptacle 26 mounted at spaced positions therein and extending through the carriage. Receiving tubes 27 and 28 are removably secured at 29 and 30 to the lower ends of the receptacles 24 and 25, the lower ends of these tubes being temporarily closed so that all of the polarized articles 15, with their negative poles uppermost disposed in the receptacle 24, will be stacked in the tube 27 and all of the polarized articles 15, with their positive poles uppermost passing through the receptacle 25, will be stacked in the tube 28. A tube 31 is fixed to the lower end of the receptacle 26 by any suitable means, not shown, to direct rejected articles into any suitable receptacle.

The carriage 21 is under the control of air cylinders 35 and 36 through their piston rods 37 and 38. One or more adjustable stops, such as the adjustable stop 39, may be provided for the carriage 21. If an article 15 at the test station should prove defective, a circuit will be completed in the test unit 17 and through a solenoid 40 to operate a valve 41 to cause air cylinder 36 to operate to locate the reject receptacle 26 at the receiving station 12. Through a conventional timing means in the test unit 17, the first circuit through the solenoid 40 is opened and a circuit through a solenoid 42 is closed to return the carriage to what may be called a normal position with the receptacle 24 in the receiving station. If the carriage is in the position shown, with the receptacle 24 in the receiving station 12, and the next article in the test station has its positive pole uppermost, a circuit will be completed through a solenoid 44 to operate valve 45, to operate air cylinder 35, to move receptacle 25 to the receiving station. In a similar manner a time controlled means in the test unit may open the circuit to solenoid 44 and close a circuit to solenoid 46 to return the carriage to its normal position.

The transfer means for transferring an article from the feed station 10 to the test station 11, while at the same time an article previously tested at the test station is moved from the test station to the receiving station 12, includes primarily a transfer head 48 having tubes or hollow tubular members 49 and 50 which, as shown in FIG. 2, communicate with each other through their passageways which are connected to a line 51 extending to a valve 52. It is desirable to have suctions in the tubes 49 and 50 to pick up the articles respectively at the feed station 10 and the test station 11 and to open the tubes to atmosphere when they have been moved respectively to stations 11 and 12. This is accomplished in one instance by connecting the line 51 through valve 52, as shown in FIG. 2, to a vacuum system including a vacuum pump 53 and, in the other instance, by connecting the line 51 to an air line 54 open to the atmosphere.

The valve 52 is responsive to switches 56 and 57 normally open and included in circuits 58 and 59 including sources of electrical energy 60 and 61, respectively, and their respective solenoids 62 and 63 for operating the valve 52 to respectively connect line 51 with the vacuum system 53 and the air line 54.

The drive means for the apparatus originates with a motor, not shown, driving a motor shaft 65 which extends through a cover 66 of a housing 67 mounted on a frame 68 which supports the other features previously described. A pinion 70 is mounted on the lower end of the motor shaft 65 and interengages a gear 71. The gear 71 is fixed to an inner portion of a clutch, the outer portion thereof being shown at 72. The particular details of the clutch are believed well known in the art and are not disclosed in detail, it being understood that the clutch is adapted to rotate a cam shaft 73 through half cycles with intermittent dwells of predetermined time intervals. The outer clutch member 72 has a cam 74 mounted thereon with diametrically opposed stops 75 cooperating with an end 76 of a clutch lever or element 77 controlling the half cycles of the shaft 73.

The lever 77 is pivotally supported at 78 and extends laterally to a position where it is connected at 79 to a core pin 80 of a solenoid 81. The solenoid 81 is operated at predetermined intervals, which allow dwells or intervals of rest of the shaft 73 after each half cycle, through a commercially known time control unit 82 receiving its electrical energy from a source 83.

A spring 84 concentric with the core 80 of the solenoid 81 serves normally to move the core outwardly to cause the portion 76 to ride on the cam surfaces interposed between the stops 75 when the solenoid 81 is de-energized. A locating means for the clutch 72, serving to position the shaft 73 at the ends of its half cycle movements, includes a wedge-shaped detent 86 mounted on a lever 87 and receivable in a similarly shaped recess 88 of a flange 89 on the member 72. The lever 87, pivotally supported at 90 on the bottom of the housing 67, is normally urged to cause its detent 86 to ride on the periphery of the flange 89 and to enter the recess 88 by a spring 91, and is forced outwardly to disengage the detent 86 from the recess by a pin 92 carried by the portion 76 of the lever 77, so that the detent will free the clutch member simultaneously with the freeing of the portion 76 of the lever 77 from its respective stop 75.

A cam 94 is eccentrically mounted on the lower end of the shaft 73, as illustrated at 95 in FIG. 2, and disposed in a hollow portion 96 of a slide 97 which is supported in parallel guides 98, only one of which is shown. Parallel surfaces of the hollow portion 96 of the slide 97 are engaged by the cam 94 resulting in movement of the slide sufficient distances laterally to move the head 48 from the position shown in FIG. 2, to the position shown in FIG. 3, and back to the position shown in FIG. 2, during the successive operations of the apparatus.

The head 48 is supported by a rod 100 movable vertically in a holder 101 and urged upwardly by a spring 102. A pin 103, extending through the rod 100, rides in a slot 104 of the holder 101 to hold the rod and head against turning. A member 105, mounted on the upper end of the rod 100, has a projection 106 with a curved upper surface positioned to be engaged by an auxiliary cam 107 mounted on the undersurface of the cam 94 to transmit the vertical motions to the head 48, while in the position shown in FIGS. 2 and 3.

The switches 56 and 57 are under control of cams 110 and 111, respectively, to bring about action of the suction means to condition the tubes 49 and 50 to pick up the articles at their feed and test positions and to free the articles at their respective test and receiving positions.

*Operation*

When the apparatus is set in operation with a continuous supply of articles 15 advancing to the feed station 10, the solenoid 81 operates at predetermined intervals to move the head 48 downwardly to the position shown in FIG. 2 through the action of the auxiliary cam 107 and with the suction means connected to the tubes 49 and 50, as shown in FIG. 2. This condition exists during the next half cycle of the shaft 73 which, at the beginning of the half cycle, allows the head 48 to move upwardly after which the cam 94 moves the slide 97 to move the head 48 to the left taking an article from the feed station 10 with the tube 49 and aligning it with the nest 19 at the test station 11 while, at the same time, the tube 50 having removed a tested article from the test station, has aligned it with the receiving station 12' However, immediately, after or during the interval, the article, supported by the tube 50, was under test at the test station, certain circuits were operated depending first upon whether or not the article was accepted or to be rejected and, second, upon the position of its poles.

If the article is to be rejected, the air cylinder 36 will be operated to locate the receptacle 26 at the receiving station, but if the negative pole of the article is uppermost, the receptacle 24 will be located at the receiving station. Whereas, if a positive pole of the article was uppermost, the receptacle 25 will be located at the receiving station 12.

These actions, therefore, are responsive first to the condition of each article and to the positions of the poles thereof causing the air cylinders 35 and 36 to be operated selectively to bring the proper receptacle into the receiving station. Therefore, the apparatus is completely automatic in its actions in testing and sorting or, in other words, in feeding, testing, orienting acceptable articles, and discarding defective articles.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing and sorting polarized articles of like contours and sorting them according to the positions of their poles comprising:

a feed station, a test station, a receiving station, means to feed the articles unoriented as to their poles successively to the feed station, means operable to transfer the articles singly from the feed station to the test station and from the test station to the receiving station, a carriage movably mounted at the receiving station, receptacles supported at spaced positions by the carriage to selectively receive in one receptacle articles with their negative poles uppermost and to selectively receive in another receptacle articles with their positive poles uppermost, means operable to move the carriage to locate the receptacles at the receiving station, a test unit disposed at the test station and responsive to the polarity of each article at the test station to cause operation of the moving means for the carriage to locate the receptacles selectively for their respective articles, the transfer means including a transfer head and tubular members carried by the transfer head and having ends spaced to engage respectively an article at the feed station and an article at the test station, a slide supporting the transfer head for lateral and vertical movements, means operable to impart lateral movements to the slide between intervals of rest to move the tubular members from pickup positions adjacent the feed station and the test station to deposit positions adjacent the test station and the receiving station, means connected to the transfer head to normally urge the head in a direction to hold the tubular members free of the stations, and means responsive to the lateral moving means to move the transfer head to cause the tubular members to move toward the stations adjacent the ends of their lateral movements and to free the transfer head to move the tubular members free of the stations prior to the lateral movements of the tubular members.

2. An apparatus for testing and sorting polarized articles of like contours and sorting them according to the positions of their poles comprising:

a feed station, a test station, a receiving station, means to feed the articles unoriented as to their poles successively to the feed station, means operable to transfer the articles singly from the feed station to the test station and from the test station to the receiving station, a carriage movably mounted at the receiving station, receptacles supported at spaced positions by the carriage to selectively receive in one receptacle articles with their negative poles uppermost and to selectively receive in another receptacle articles with their positive poles uppermost, means operable to move the carriage to locate the receptacles at the receiving station, a test unit disposed at the test station and responsive to the polarity of each article at the test station to cause operation of the moving means for the carriage to locate the receptacles selectively for their respective articles, the transfer means including a transfer head and tubular members carried by the transfer head and having ends spaced to engage respectively an article at the feed station and an article at the test station, a slide supporting the transfer head for lateral and vertical movements, means operable to impart lateral movements to the slide between intervals of rest to move the tubular members from pickup positions adjacent the feed station and the test station to deposit positions adjacent the test station and the receiving station, the lateral moving means including a main drive, a driven shaft, a clutch interposed between the main drive and the driven shaft and adapted when released to connect the main drive to the driven shaft, a cam on the driven shaft operatively associated with the slide to move the slide laterally, and an element normally holding the clutch inactive and actuable to free the clutch for causing successive half cycles of the driven shaft.

3. An apparatus for testing and sorting polarized articles of like contours and sorting them according to the positions of their poles comprising:

a feed station,
a test station,
a receiving station, means to feed the articles unoriented as to their poles successively to the feed station, means operable to transfer the articles singly from the feed station to the test station and from the test station to the receiving station, a carriage movably mounted at the receiving station, receptacles supported at spaced positions by the carriage to selectively receive in one receptacle articles with their negative poles uppermost and to selectively receive in another receptacle articles with their positive poles uppermost, means operable to move the carriage to locate the receptacles at the receiving station, a test unit disposed at the test station and responsive to the polarity of each article at the test station to cause operation of the moving means for the carriage to locate the receptacles selectively for their respective articles, the transfer means including a transfer head and tubular members carried by the transfer head and having ends spaced to engage respectively an article at the feed station and an article at the test station, a slide supporting the transfer head for lateral and vertical movements, means operable to impart lateral movements to the slide between intervals of rest to move the tubular members from pickup positions adjacent the feed station and the test station to deposit positions adjacent the test station and the receiving station, the lateral moving means including a main drive, a driven shaft, a clutch interposed between the main drive and the driven shaft and adapted when released to connect the main drive to the driven shaft, a cam on the driven shaft operatively associated with the slide to move the slide laterally, an element normally holding the clutch inactive and actuable to free the clutch for causing successive half cycles of the driven shaft, and a unit energized intermittently to actuate the element to free the clutch.

4. An apparatus for testing and sorting polarized articles of like contours and sorting them to the positions of their poles comprising:

a feed station,
a test station,
a receiving station, means to feed the articles unoriented as to their poles successively to the feed station, means operable to transfer the articles singly from the feed station to the test station and from the test station to the receiving station, a carriage movably mounted at the receiving station, receptacles supported at spaced positions by the carriage to selectively receive in one receptacle articles with their negative poles uppermost and to selectively receive in another receptacle articles with their positive poles uppermost, means operable to move the carriage to locate the receptacles at the receiving station, a test unit disposed at the test station and responsive to the polarity of each article at the test station to cause operation of the moving means for the carriage to locate the receptacles selectively for their respective articles, the transfer means including a transfer head and tubular members carried by the transfer head and having ends spaced to engage respectively an article at the feed station and an article at the test station, a slide supporting the transfer head for lateral and vertical movements, means operable to impart lateral movements to the slide between intervals of rest to move the tubular members from pickup positions adjacent the feed station and the test station to deposit positions adjacent the test station and the receiving station, the lateral moving means including a main drive, a driven shaft, a clutch interposed between the main drive and the driven shaft and adapted when released to connect the main drive to the driven shaft, a cam on the driven shaft operatively associated with the slide to move the slide laterally, an element normally holding the clutch inactive and actuable to free the clutch for causing successive half cycles of the driven shaft, a unit energized intermittently to actuate the element to free the clutch, a pivotally supported positioning member having a projection receivable in a recess of the clutch to control the position of the driven shaft at the end of each half cycle to align the tubular members with their respective stations, and a projection carried by the element and adapted to move the positioning member and its projection free of the clutch when the clutch is freed to engage the main drive and the driven shaft.

References Cited in the file of this patent
UNITED STATES PATENTS

| | | |
|---|---|---|
| 2,900,146 | Hafner | Aug. 18, 1959 |
| 2,999,587 | Campbell | Sept. 12, 1961 |
| 3,016,142 | Brown | Jan. 9, 1962 |